March 22, 1966 — P. I. CORBELL — 3,242,486
INTRUSION DETECTION SYSTEM
Filed April 20, 1962
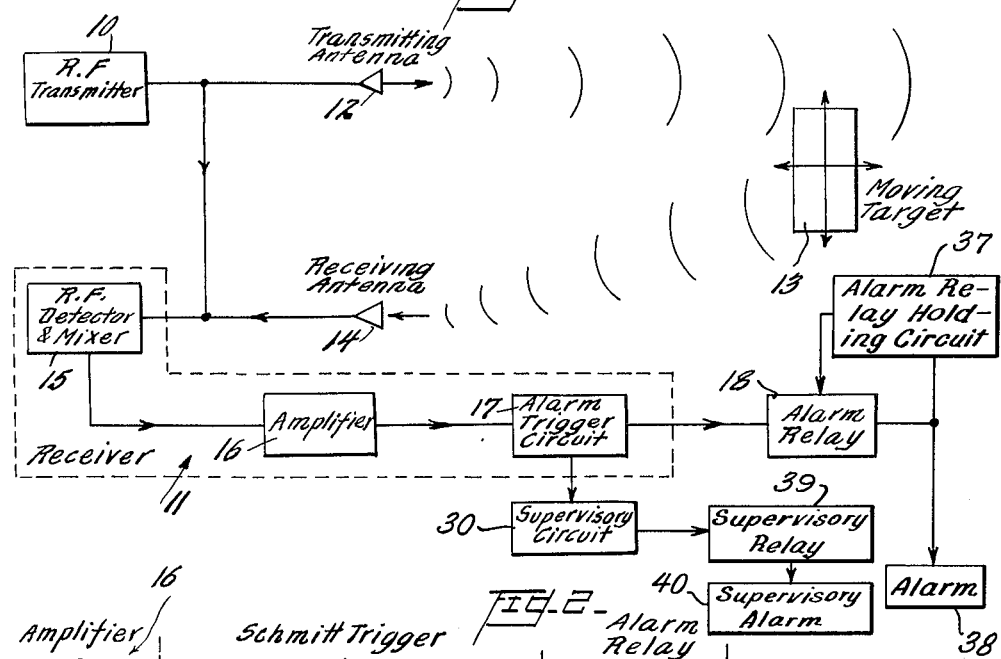
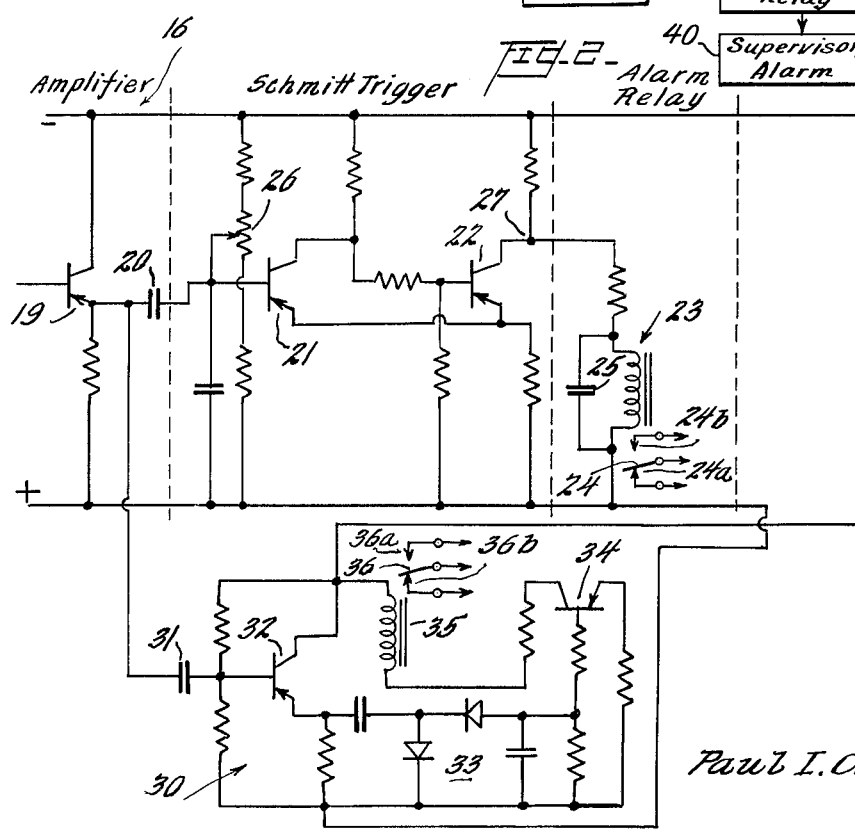
INVENTOR
Paul I. Corbell,
BY Paris, Haskell & Levine
ATTORNEYS

United States Patent Office 3,242,486
Patented Mar. 22, 1966

3,242,486
INTRUSION DETECTION SYSTEM
Paul I. Corbell, Rockville, Md., assignor to Johnson Service Company, Milwaukee, Wis., a corporation of Wisconsin
Filed Apr. 20, 1962, Ser. No. 189,170
20 Claims. (Cl. 343—7)

The present invention relates to motion detection, particularly as applied to intrusion alarm systems. To this end, the present invention is concerned with a system for protecting an enclosure such as a room or warehouse or a building, or a perimeter area surrounding a building or compound of buildings, by providing an alarm upon the entry of a body into the protected area. Numerous systems have been suggested for this purpose, wherein some form of energy, such as ultrasonic or electromagnetic, is radiated into the area protected. The presence of an intruder or intruding body into the protected area is ascertained by detecting a change in this energy as a result of the intrusion. Various effects upon the energy caused by the intrusion can be utilized as the basis for detection, and one of these effects is the creation of a Doppler frequency in the energy content of the area as a result of movement of the intruding body.

The present invention utilizes this Doppler effect to detect intrusion. The Doppler effect is utilized by radiating into the protected area energy of a given frequency, and coupling a portion of the transmitter energy into a receiver, which also receives reflected energy from bodies in the protected area. All the signals in the receiver are mixed, and if one of these signals is different in frequency from another such as would be occasioned by the Doppler effect resulting from movement of a body in the area, the difference or Doppler frequency is present in the output of the mixer. This Doppler frequency is detected and utilized to energize or trigger an alarm to indicate the presence of an intruder.

In prior art intrusion detection systems utilizing the Doppler principle, it is usual to integrate the detected Doppler signal over a period of time before causing it to trigger an alarm. This is done to prevent spurious alarms as a result of electrical noise in the receiver system, low level modulations in the transmitted signal, and low level Doppler signals resulting from normal or expected movements or changes in the protected area. For example: when using ultrasonic radiated energy, convection air currents provide a Doppler signal; when using electromagnetic energy, fluorescent lights cause a Doppler effect; when protecting a warehouse, a mouse may scurry across the floor and produce a Doppler effect; when protecting an outdoor perimeter area, a tree may sway in the wind, or an animal may penetrate the protected area, resulting in a Doppler signal. The time integration of the Doppler signal, while for the most part being effective to prevent triggering of the alarm by such occurrences as afore-described, inherently thereby desensitizes the system to the detection of an intruder whose presence it is desired to detect. With a time integrating system, if an intruder keeps his movements slow, the integrated level of the Doppler signal will be correspondingly low and may never exceed the alarm triggering level.

The present invention, contrary to the prior art integrating approach, uses a trigger circuit capable of giving a positive and definite output signal in response to but a single cycle of Doppler signal, and this output signal is utilized to trip the alarm. With the present invention it thus becomes practically impossible to intrude upon the protected area without being detected. Indeed, experiments have shown that the system can be set to a sensitivity wherein a person can not stand still enough in a protected area to avoid detection. In order to avoid spurious alarms in response to such natural occurrences as above suggested, the present invention utilizes an amplitude descriminator. Thus, contrary to the averaging approach of the prior art, the present invention eliminates signals which would otherwise set off the trigger circuit, by the characteristic of the signal per se which determines whether it is caused by an intruder or not. For example, if a man intrudes upon a protected area, the power of the received echo or reflected signal from this intruder is of a particular value regardless of how slow his movements may be. Thus, when the amplitude discriminator is set to respond to a signal of this amplitude, the alarm will be triggered no matter how slow the Doppler frequency.

The use of signal amplitude as the means to discriminate between occurrences which are desired to be detected and those that are not desired, leaves the normal and perhaps even purposely introduced low level mixer output of expected Doppler frequency range available for supervisory control of the system. That is, these low amplitude signals can be time integrated or averaged as a detection of system operation, in that should these background signals fail to appear in the mixer output and be detected in the supervisory circuit, it would become immediately apparent that the system is not functioning, or at least is not functioning properly.

Accordingly it is one object of the present invention to provide for intrusion detection of an area.

Another object of the present invention is to provide for such detection by detecting the movement of the intruding body.

Another object of the present invention is to detect such movement by utilizing the Doppler effect of the movement upon energy radiated into the area.

Another object of the present invention is to provide for such Doppler detection of intrusion into an area, and utilizing amplitude discrimination of the Doppler signal to differentiate between wanted and unwanted Doppler signals.

Still another object of the present invention is to provide for such Doppler detection of intrusion into an area, wherein an intrusion indication is triggered immediately upon receipt of a Doppler signal exceeding a predetermined amplitude.

And a still further object of the present invention is to provide for such Doppler detection of intrusion into an area, wherein the presence of apparent or real Doppler signals below said determined amplitude are time integrated and utilized to supervise the proper operation of the system.

Other objects and advantages of the present invention will become apparent to those skilled in the art from a consideration of the following detailed description of one specific exemplary embodiment of the invention, had in conjunction with the accompanying drawings, in which like numerals refer to like or corresponding parts, and wherein:

FIG. 1 is a functional block diagram of the system of the present invention; and FIG. 2 is a schematic diagram of the circuit of a portion of the system shown in FIG. 1.

The system of the present invention is shown in FIG. 1 as comprising a transmitter 10 and receiver 11. The transmitter output is radiated from antenna 12 and is shown impinging upon a moving body or target 13, from which the radiated energy is reflected and picked up by receiver antenna 14. Although other forms and frequency bands of radiated energy may be used it is preferred to operate the present system with electromagnetic energy, and preferably in the X band with a wavelength of approximately 3 cm. and a frequency of about 10,525±25 megacycles. The Doppler frequency ΔF for electromagnetic waves is related to the velocity of light C, the radial velocity $v$ of the moving target relative to point of reception of the energy, and the frequency of the transmitted energy $f_o$, in accordance with the formula $$\Delta F = 2f_o v/C$$

Therefore, the Doppler frequency $\Delta F$ for the wavelength above suggested is approximately 31 cycles per second for a target moving at a radial velocity of 1 mile/hour. Thus, intrusion bodies or targets moving at slow to ordinary speeds fall conveniently into the low audio spectrum and may be reasonably easily amplified and handled.

In addition to the signal radiated from antenna 12, a portion of the RF energy of transmitter 11 is coupled directly into receiver 11, thus the receiver obtains both transmitted and reflected energy signals. When there is a moving target 13 within the effective range of the system, that portion of the energy reflected therefrom has its frequency shifted by the amount of the Doppler frequency $\Delta F$. The signals obtained in the receiver 11 and applied to the RF detector and mixer 15 therefore include the transmitted frequency $f_o$ and $f_o \pm \Delta F$. The difference or Doppler frequency $\Delta F$ is taken from the output of the mixer 15, amplified at 16, and then applied to the alarm trigger circuit 17. If there is no Doppler frequency, no activating signal is applied to trigger circuit 17; if there is a Doppler frequency, and the resultant Doppler signal exceeds a threshold value in amplitude for which the trigger circuit is set, the alarm relay 18 is immediately operated to indicate the presence of an intruder by means of an audible alarm or other indication.

Since the RF transmitter 11, RF detector and mixer 15, and amplifier 16 may comprise a conventional low power Doppler radar system, these circuits are not shown or described in detail. However, the trigger circuit 17 and alarm relay 18 are shown in detail in FIG. 2.

The output of the amplifier 16 is coupled by an emitter follower 19 through capacitor 20 to the base of the transistor 21 in the alarm trigger circuit 17. In the preferred embodiment of the invention a Schmitt trigger is selected for the alarm trigger circuit 17 because it conveniently combines the functions of amplitude discrimination and immediate trigger output in response to a Doppler frequency signal having a peak value in excess of a prescribed voltage. However, it is understood that other circuits performing these functions might be substituted therefor if desired. The Schmitt trigger comprises the input transistor 21 and output transistor 22, with the collector-emitter circuit of input transistor 21 connected across the emitter-base circuit of the output transistor 22. As is understood in the art, the Schmitt trigger has a stable state of transistor 21 conducting and transistor 22 quiescent. When an input signal is applied to the base of transistor 21 in excess of the D.C. bias voltage thereon, the condition of transistors 21 and 22 is reversed, and output transistor 21 becomes quiescent until the voltage on the base of transistor 21 returns to a value below the original D.C. bias voltage, whereupon the circuit returns to its original stable state with transistor 21 conducting and transistor 22 quiescent. The D.C. bias on transistor 21 is adjustably selected by means of potentiometer 26.

The alarm relay circuit 18 comprises the relay 23 operating switch 24. Relay 23 is connected in parallel across the emitter-collector circuit of output transistor 22. When output transistor 22 changes from a quiescent to a conductive state, the voltage at junction 27 falls; thus, the relay 23 may be considered as energized when transistor 22 is quiescent, and deenergized when transistor 22 is conducting. For fail-safe operation, switch 24 is spring biased to engage contact 24a, which is the alarm position, and the position occupied when transistor 22 becomes conductive. When transistor 22 is quiescent and relay 23 is energized, switch 24 is brought into engagement with contact 24b, indicating no alarm. In the foregoing discussion, reference was made to an energized and deenergized state for relay 23. It will be appreciated that these terms are used in a relative or functional sense since some current is always passing through the relay 23, and the difference between the energized and deenergized states is the amount of such current. Because of the inductive impedance of the coil of relay 23, in order to make the relay more immediately responsive to the presence of a change in the state of the trigger circuit, a capacitor may be applied across the relay coil. This capacitor is selected in value to enable the voltage at junction 27 to change more rapidly and not be delayed by the electrical inertia occasioned by the induction in the coil of relay 23.

It will thus be appreciated that if a moving body represented by target 13 is present in the effective field of the radar system, an A.C. signal is obtained as a result thereof at the output transistor 19 of amplifier 16, which has a frequency equal to the Doppler frequency $\Delta F$ for that target. The first cycle of the Doppler signal output from transistor 19 which exceeds the trigger threshold, or the D.C. bias value on transistor 21, operates the trigger circuit 17, and causes relay 23 to operate an alarm 38 or other indicator through switch 24. Switch 24 is associated with any conventional holding circuit 37 for maintaining the alarm on, despite the fact that the trigger circuit will cycle between its two states of transistor conduction with each rise and fall of the Doppler signal waveform.

By adjusting potentiometer 26, the trigger circuit is adjusted to respond to a selected amplitude of Doppler signal. It will be appreciated that the amplitude of Doppler signal obtained at the amplifier output 19 is a function of the reflected signal field strength picked up by the receiver. Thus, it is a function of the range, size, and reflective characteristics of the target. It has nothing to do with the speed or quantity of movement of the target. The latter factor affects only the frequency and duration of the Doppler signal. Thus for a specific environment, an in situ adjustment of the potentiometer 26 may be made to set the amplitude discrimination above any background Doppler signal, and above any other expected occurrence that might provide a spurious alarm—such as, for example—reflections from the moving ion column in a fluorescent light. Thereafter, when a human body intrudes upon the space under surveillance by the system, the power of reflected energy from this body will exceed the amplitude level for which potentiometer 26 is set, and immediately cause an alarm.

In view of the amplitude discrimination aspect of the trigger circuit 17, a low level background Doppler signal can be used for supervisory purposes to insure that the detection system is in proper operating order. This low level background signal is of insufficient peak amplitude to operate the trigger circuit, and since it is not integrated by the trigger circuit, it cannot initiate a trigger signal as a result of accumulation over a time period. To insure the presence of a certain amount of background Doppler signal in the circuit, it is preferred that the current used to energize the filament of the klystron tube which may be used in the transmitter 11, be an imperfectly filtered current having an A.C. component in it, e.g. of 120 cycles. This will provide a modulation of 120 cycles in the output of the klystron, which will provide a 120 cycle signal output from the detector-mixer 15, as an apparent Doppler signal. This apparent Doppler signal appears at the output of the amplifier emitter follower transistor 19, but is not of sufficient peak amplitude to affect the trigger circuit 17. This signal along with the entire output of transistor 19 is however fed to and affects the supervisory circuit 30.

The A.C. output of amplifier 16 is coupled through capacitor 31 and by emitter follower transistor 32 to an integrating network 33. Here the low level signals such as those previously identified as apparent and background Doppler signals are integrated over time to obtain an output voltage on the base of conditioning transistor 34 sufficient to cause it to conduct and maintain relay 35 energized.

Supervisory relay 39, shown in detail in FIG. 2, includes relay 35 and switch 36. Relay 35 controls switch 36, which is spring biased to a normal position of engagement with contact 36a. When relay 35 is energized to a sufficient level, however, it draws switch 36 into engagement with contact 36b. Closure of switch 36 to contact 36a energizes a malfunction alarm or indicator 40 while closure of switch 36 to contact 36b energizes a normal operation indicator.

Thus, so long as the low level apparent and/or background Doppler signals from amplifier 16 are properly present and applied to integrating network 33, the resultant control voltage on transistor 34 maintains it conducting sufficiently to energize relay 35 and hold switch 36 in engagement with contact 36b. However, should the power level of the transmitter fall appreciably, or should there be a power failure, or other malfunction, such as to reduce appreciably or eliminate the low level background and/or apparent Doppler signal out of the amplifier 16 for a period of time sufficient to lower or extinguish conduction through transistor 34 to the point where relay 35 no longer restrains switch 36 from engagement with contact 36a, then by closure of switch 36 to contact 36a a malfunction alarm is initiated. In this instance, as with the intruder alarm, contact 36a may be associated with a holding circuit, so that once tripped the malfunction indication will remain until manually reset.

It will be appreciated that there has been presented in the foregoing description an intrusion alarm system utilizing Doppler radar to sense the presence of a moving object in the field of the radar system, and an amplitude discriminator trigger for tripping an alarm immediately upon the existence in the system of a Doppler signal exceeding a preset selected peak amplitude. In addition, the present system employs a low level background signal having a Doppler frequency (i.e. a frequency within the expected range of Doppler frequencies to which the system is designed to respond), whose time integrated value is utilized to supervise the system and detect its malfunction or failure in opertion. This detailed description of one embodiment of the invention is presented only for purposes of example to facilitate a complete understanding of the invention, and it is not intended that the invention be considered as limited to the details of this embodiment.

Variations, changes, and modifications of this invention will be apparent to those skilled in the art, and such as are embraced by the spirit and scope of the appended claims are contemplated as within the purview of the present invention.

What is claimed is:

1. An alarm system for detecting the presence of a moving body in an area, comprising means for radiating energy into said area having a frequency characteristic, means for receiving a portion of said radiated energy, means for detecting the presence of changes in said frequency characteristics in said received energy and providing a signal output in response to said changes related in frequency to said changes and related in amplitude to the concurrent field strength of said received energy having said changes, and means for discriminating between signal outputs having an amplitude in excess of a given level and those having an amplitude less than said level and providing a trigger output in response to a single cycle of said signal having an amplitude value in excess of said given level.

2. An alarm system as set forth in claim 1, and further including means responsive to said trigger output for initiating and holding an alarm.

3. An alarm system as set forth in claim 1, wherein said discriminating means comprises an amplitude responsive flip-flop circuit.

4. An alarm system as set forth in claim 1, and further including means for integrating said signal output, and means responsive to the level of said integrated signal for indicating whether said integrated signal level is above or below a given value.

5. An alarm system for detecting the presence of a moving body in an area, comprising a Doppler radar system for producing an output signal having a Doppler frequency indicative of a moving body in the effective radiated energy field of the system, said signal being related in amplitude to the concurrent field strength of the reflected signal received from the moving body, and means for discriminating between said output signal having an amplitude in excess of a given level and having an amplitude less than said given level and providing a trigger output in response to a single cycle of said signal having an amplitude value in excess of said given level.

6. An alarm system as set forth in claim 5, wherein said discriminating means is an amplitude discriminating flip-flop occupying a first state when said amplitude of said signal is below said given level and a second state when said amplitude is above said given level.

7. An alarm system as set forth in claim 6, wherein said flip-flop includes means for varying said given level.

8. An alarm system as set forth in claim 6, and further including a relay operable between a relatively energized and relatively deenergized state in response to said two states of said flip-flop.

9. An alarm system as set forth in claim 8, and further including an alarm controlled by said relay.

10. An alarm system as set forth in claim 8, and further including a supervisory circuit comprising means for integrating over time the entire A.C. output of said Doppler radar system, and means responsive to the voltage level of said integrating means for controlling an indicator to indicate whether said voltage level of said integrating means is above or below a predetermined value.

11. An alarm system as set forth in claim 10, wherein the last mentioned means includes a relay.

12. An alarm system as set forth in claim 11, and further including an indicator controlled by said relay.

13. An alarm system for detecting the presence of a moving body in a limited and defined area, comprising means for radiating energy into said area having a frequency characteristic and having a radiated power level so as to substantially confine its effective detection level to said area, means for receiving a portion of said radiated energy and for detecting the presence of a Doppler signal in said received energy, and pulse responsive trigger means coupled to said receiving means and actuated by a single cycle of said Doppler signal for triggering an alarm.

14. An alarm system as set forth in claim 13, wherein said trigger means includes means for limiting its actuation to a Doppler signal cycle having an amplitude in excess of a selected value.

15. An alarm system as set forth in claim 14, wherein said trigger means is a flip-flop circuit.

16. An alarm system as set forth in claim 13, and further including a supervisory circuit coupled to said receiving means having means for integrating said Doppler signal and means responsive to the level of the integrated signal for indicating when said integrated signal level is below a given value.

17. An alarm system for detecting the presence of a moving body in an area, comprising a Doppler radar system for producing an output signal having a Doppler frequency indicative of a moving body in the effective radiated energy field of the system, said signal being related in amplitude to the concurrent field strength of the reflected signal received from the moving body, means for discriminating between said output signal having an amplitude in excess of a given level and having an amplitude less than said given level and providing a trigger output when the amplitude of said signal exceeds said given level, and a supervisory circuit comprising means for integrating over time the entire A.C. output of said Doppler radar system, and means responsive to the voltage level of said integrating means for controlling an indicator to indicate whether said voltage level of said integrating means is above or below a predetermined value.

18. An alarm system as set forth in claim 17, wherein the last mentioned means includes a relay.

19. An alarm system as set forth in claim 18, and further including an indicator controlled by said relay.

20. An alarm system for detecting the presence of a moving body in a limited and defined area, comprising means for radiating energy into said area having a frequency characteristic and having a radiated power level so as to substantially confine its effective detection level to said area, means for receiving a portion of said radiated energy and for detecting the presence of a Doppler signal in said received energy, pulse responsive trigger means coupled to said receiving means and actuated by a cycle of said Doppler signal for triggering an alarm, a supervisory circuit coupled to said receiving means having means for integrating said Doppler signal, and means responsive to the level of the integrated signal for indicating when said integrated signal level is below a given value.

References Cited by the Examiner

UNITED STATES PATENTS

| | | | |
|---|---|---|---|
| 2,767,393 | 10/1956 | Bagno | 340—258 |
| 2,782,405 | 2/1957 | Weisz et al. | 340—258 |
| 2,794,974 | 6/1957 | Bagno et al. | 340—258 |
| 2,903,683 | 9/1959 | Bagno | 340—258 |
| 2,965,893 | 12/1960 | Barker | 343—8 X |
| 3,012,241 | 12/1961 | Miller | 343—7 |
| 3,076,897 | 2/1963 | Skirvin | 340—258 |
| 3,134,100 | 5/1964 | Lakatos | 343—7 X |

CHESTER L. JUSTUS, *Primary Examiner.*